US010290391B2

United States Patent
Kato et al.

(10) Patent No.: US 10,290,391 B2
(45) Date of Patent: May 14, 2019

(54) TRANSPARENT CONDUCTIVE FILM

(71) Applicant: NITTO DENKO CORPORATION, Ibaraki-shi, Osaka (JP)

(72) Inventors: Daiki Kato, Ibaraki (JP); Nozomi Fujino, Ibaraki (JP); Tomotake Nashiki, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/576,383

(22) PCT Filed: Oct. 30, 2015

(86) PCT No.: PCT/JP2015/080655
§ 371 (c)(1),
(2) Date: Nov. 22, 2017

(87) PCT Pub. No.: WO2016/189761
PCT Pub. Date: Dec. 1, 2016

(65) Prior Publication Data
US 2018/0211744 A1    Jul. 26, 2018

(30) Foreign Application Priority Data

May 27, 2015  (JP) ................................ 2015-106977
Oct. 15, 2015  (JP) ................................ 2015-203516

(51) Int. Cl.
*B32B 3/00* (2006.01)
*H01B 5/14* (2006.01)
(Continued)

(52) U.S. Cl.
CPC ................. *H01B 5/14* (2013.01); *B32B 7/02* (2013.01); *G06F 3/041* (2013.01); *B32B 2307/202* (2013.01); *B32B 2307/412* (2013.01)

(58) Field of Classification Search
CPC ..... G06F 3/041; B32B 7/02; B32B 2457/208; B32B 2307/536
See application file for complete search history.

(56) References Cited

U.S. PATENT DOCUMENTS

| 2013/0113757 A1 | 5/2013 | Tanaka et al. |
| 2015/0055033 A1* | 2/2015 | Imamura ................... B32B 7/02 349/12 |
| 2015/0062710 A1* | 3/2015 | Grillmayer ......... H01J 37/3405 359/585 |

FOREIGN PATENT DOCUMENTS

| CN | 104339734 A | 2/2015 |
| JP | 4214063 A | 1/2009 |

(Continued)

OTHER PUBLICATIONS

International Search Report dated Jan. 26, 2016, issued in counterpart International Application No. PCT/JP2015/080655 (2 pages).

(Continued)

*Primary Examiner* — Elizabeth E Mulvaney
(74) *Attorney, Agent, or Firm* — Westerman, Hattori, Daniels & Adrian, LLP (57) ABSTRACT

A transparent conductive film includes: a transparent substrate film; an antistripping layer with a thickness of 1.5 nm to 8 nm formed on one main surface of the substrate film; an optical adjustment layer with a thickness of 10 nm to 25 nm formed on the antistripping layer; and a transparent conductor layer with a pattern formed on the optical adjustment layer. The transmission Y value measured from a side of the transparent conductor layer is 88.0 or more and the reflection color difference ΔE between a pattern portion and a non-pattern portion is 7.0 or less.

19 Claims, 2 Drawing Sheets (51) Int. Cl.
   *B32B 7/02*      (2019.01)
   *G06F 3/041*     (2006.01)

(56) References Cited

FOREIGN PATENT DOCUMENTS

| | | |
|---|---|---|
| JP | 2009-32548 A   | 2/2009 |
| JP | 2009-143754 A  | 7/2009 |
| JP | 2010-184478 A  | 8/2010 |
| JP | 2011-175900 A  | 9/2011 |
| JP | 2013-211134 A  | 10/2013 |
| JP | 2014-19038 A   | 2/2014 |
| JP | 2014-96241 A   | 5/2014 |
| TW | 201213136 A1   | 4/2012 |

OTHER PUBLICATIONS

Office Action dated Aug. 16, 2017, issued in counterpart of Taiwan Patent Application No. 104139009 with English Translation (11 pages).

Office Action dated Dec. 19, 2018, issued in counterpart Chinese application No. 201580071521.9, with English translation. (14 pages).

* cited by examiner

TRANSPARENT CONDUCTIVE FILM

BACKGROUND OF THE INVENTION

Field of the Invention

The present invention relates to a transparent conductive film.

Description of the Related Art

Transparent conductive films have been known (e.g. JP 4214063 B2). Transparent conductive films are obtained by each forming a transparent conductor layer on a substrate film. The transparent conductive films are widely used for touch panels and liquid crystal displays. In recent years, touch panels and liquid crystal displays with transparent conductive films have been used for in-car devices, such as car navigation systems. Accordingly, transparent conductive films have been exposed to a harsher environment (high temperature, high humidity, direct sunlight, and strong vibrations) than before.

Figure 4:
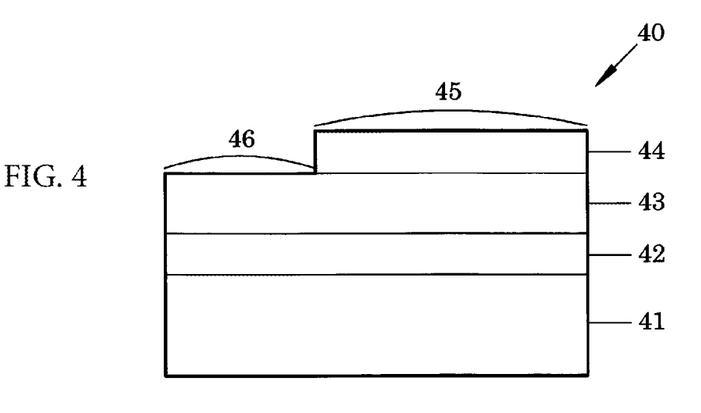
FIG. 4 is a schematic view of a conventional transparent conductive film.

FIG. 4 is a schematic view of a conventional transparent conductive film 40. In the conventional transparent conductive film 40, an antistripping layer 42 is formed on a main surface of a transparent substrate film 41 and an optical adjustment layer 43 is formed on the antistripping layer 42. Further, a transparent conductor layer 44 is formed on the optical adjustment layer 43. Since the transparent conductor layer 44 is pattern-formed, there are a pattern portion 45 with the transparent conductor layer 44 and a non-pattern portion 46 without the transparent conductor layer 44. The non-pattern portion 46 has no pattern portion on the optical adjustment layer 43. Adhesion between the substrate film 41 and the optical adjustment layer 43 is improved by sandwiching the antistripping layer 42 between the substrate film 41 and the optical adjustment layer 43. The antistripping layer 42 is, for example, made of palladium (Pd). The optical adjustment layer 43 is, e.g. silicon dioxide ($SiO_2$).

When the transparent conductive film is exposed to a harsher environment than before (high temperature, high humidity, direct sunlight, and strong vibrations), it is difficult for the conventional transparent conductive film 40 to obtain sufficient adhesion between the substrate film 41 and the optical adjustment layer 43. While adhesion becomes higher by thickening the antistripping layer 42, there is a possibility of degradation of optical characteristics (transmittance, pattern visibility of the transparent conductor layer).

PRIOR ART DOCUMENT

Patent Document

Patent document 1: JP 4214063 B2

SUMMARY OF THE INVENTION

It is an object of the present invention to achieve a transparent conductive film with high adhesion between a substrate film and an optical adjustment layer even under a high temperature and high humidity environment while maintaining optical characteristics (transmittance and pattern visibility of a transparent conductor layer) at a high level.

The present inventors have extensively conducted studies on the above-mentioned problems, and resultantly found that the above-mentioned problems are solved by a transparent conductive film which includes: an antistripping layer with a specific thickness formed on a main surface of a substrate film; and an optical adjustment layer formed on the antistripping layer, in which a transmission Y value measured from a side of a transparent conductor layer and a reflection color difference ΔE between a pattern portion and a non-pattern portion are in a specific range, leading to completion of the present invention.

The summary of the present invention is described as below.

Figure 1:
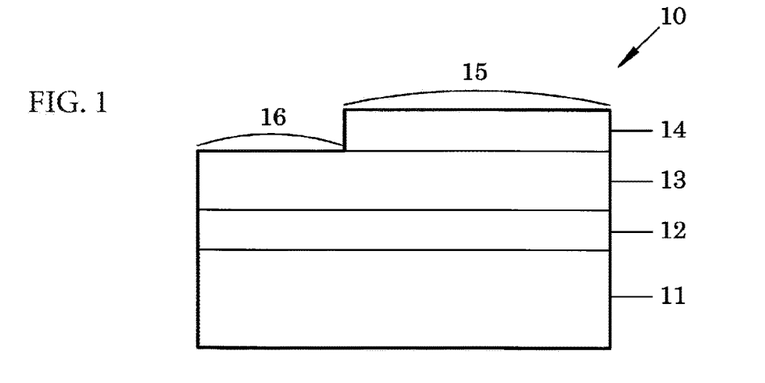
FIG. 1 is a schematic view of a first embodiment of a transparent conductive film of the present invention.

In a first preferred aspect, there is provided a transparent conductive film according to the present invention which includes: a transparent substrate film; an antistripping layer formed on one main surface of the substrate film; an optical adjustment layer formed on the antistripping layer; and a transparent conductor layer formed on the optical adjustment layer (FIG. 1). The antistripping layer includes an inorganic substance and the optical adjustment layer includes an inorganic oxide. The transparent conductor layer has a pattern. A pattern portion is a portion with the transparent conductor layer and a non-pattern portion is a portion without the transparent conductor layer. The antistripping layer has a thickness of 1.5 nm to 8 nm. A transmission Y value measured from a side of the transparent conductor layer is 88.0 or more. A reflection color difference ΔE between the pattern portion and the non-pattern portion is 7.0 or less. The reflection color difference ΔE is represented by the following formula (1) based on Japanese Industrial Standards Z8730:

$$\Delta E = [(L^*_1 - L^*_2)^2 + (a^*_1 - a^*_2)^2 + (b^*_1 - b^*_2)^2]^{0.5} \quad (1)$$

In formula (1), $L^*_1$ represents a reflection L* value of the pattern portion, $L^*_2$ represents a reflection L* value of the non-pattern portion, $a^*_1$ represents a reflection $a^*_1$ value of the pattern portion, $a^*_2$ represents a reflection $a^*_2$ value of the non-pattern portion, $b^*_1$ represents a reflection $b^*_1$ value of the pattern portion, and $b^*_2$ represents a reflection $b^*_2$ value of the non-pattern portion.

In a second preferred aspect of the transparent conductive film according to the present invention, the optical adjustment layer has a thickness of 10 nm to 25 nm.

In a third preferred aspect of the transparent conductive film according to the present invention, the antistripping layer includes a non-stoichiometric inorganic compound.

In a fourth preferred aspect of the transparent conductive film according to the present invention, the antistripping layer includes silicon atoms.

In a fifth preferred aspect of the transparent conductive film according to the present invention, the antistripping layer includes a silicon compound.

In a sixth preferred aspect of the transparent conductive film according to the present invention, the antistripping layer includes an area having Si2p bond energy of 98.0 eV or more and less than 103.0 eV when the antistripping layer includes silicon atoms (Si).

In a seventh preferred aspect of the transparent conductive film according to the present invention, the antistripping layer includes a silicon oxide.

In an eighth preferred aspect of the transparent conductive film according to the present invention, the substrate film has a thermal shrinkage of −0.5% to +1.5% in its main surface.

Figure 2:
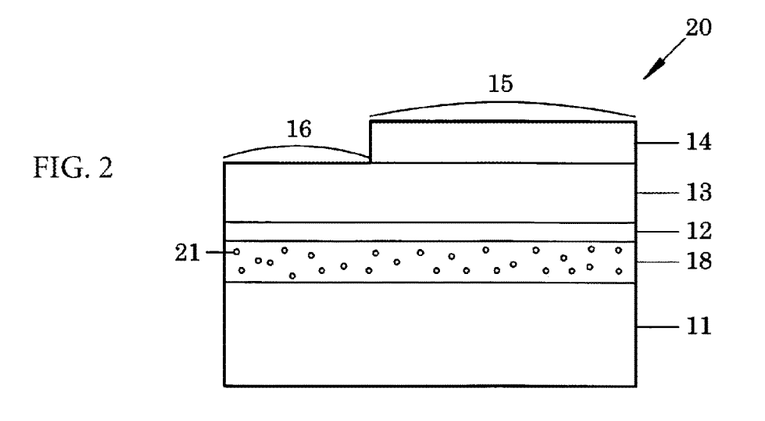
FIG. 2 is a schematic view of a second embodiment of the transparent conductive film of the present invention.

In a ninth preferred aspect, the transparent conductive film according to the present invention further includes a hard coat layer formed between the substrate film and the antistripping layer (FIG. 2).

In a tenth preferred aspect of the transparent conductive film according to the present invention, the hard coat layer has a refractive index of 1.60 to 1.70 and a thickness of 250 nm to 2,000 nm.

In an eleventh preferred aspect of the transparent conductive film according to the present invention, the hard coat layer contains any one of zirconium oxide $ZrO_2$, silicon dioxide $SiO_2$, titanium oxide $TiO_2$, tin oxide $SnO_2$, aluminum oxide $Al_2O_3$ or at least two kinds of inorganic fine particles of these.

Figure 3:
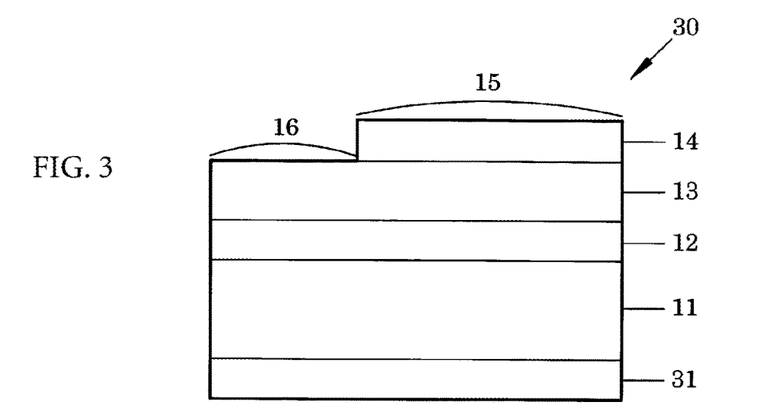
FIG. 3 is a schematic view of a third embodiment of the transparent conductive film of the present invention.

In a twelfth preferred aspect, the transparent conductive film according to the present invention further includes a functional layer formed on the other main surface of the substrate film located on a side opposite to the transparent conductor layer (FIG. 3).

In a thirteenth preferred aspect of the transparent conductive film according to the present invention, the functional layer is composed of an anti-blocking hard coat layer.

Advantages of the Invention

According to the present invention, a transparent conductive film having high adhesion between a substrate film and an optical adjustment layer even under a high temperature and high humidity environment has been achieved while maintaining optical characteristics (transmittance and pattern visibility of a transparent conductor layer) at a high level.

DESCRIPTION OF THE PREFERRED EMBODIMENTS

[Transparent Conductive Film]

FIG. 1 is a schematic view of a first embodiment of a transparent conductive film of the present invention. In a transparent conductive film 10 of the present invention, an antistripping layer 12 is formed on one main surface of a transparent substrate film 11 and an optical adjustment layer 13 is formed on the antistripping layer 12. Further, a transparent conductor layer 14 is formed on the optical adjustment layer 13. Since the transparent conductor layer 14 is patterned, a pattern portion 15 has the transparent conductor layer 14 on the optical adjustment layer 13. A non-pattern portion 16 has, however, no transparent conductor layer 14 on the optical adjustment layer 13. The antistripping layer 12 and the optical adjustment layer 13 are arranged between the substrate film 11 and the transparent conductor layer 14. This makes it possible to reduce a transmittance of the transparent conductive film 10 and color difference between the pattern portion 15 and the non-pattern portion 16. As a result, it becomes possible to obtain preferable optical characteristics when mounted on a touch panel.

FIG. 2 is a schematic view of a second embodiment of the transparent conductive film (Same reference numerals are used in portions that correspond to the configuration common to FIG. 1). In a transparent conductive film 20, a hard coat layer 18 is formed on one main surface of the transparent substrate film 11. The hard coat layer 18 may include inorganic fine particles 21. The hard coat layer 18 has a function of preventing a surface of the transparent conductive film 20 from being scratched (scratch resistance). The antistripping layer 12 is formed on the hard coat layer 18 and the optical adjustment layer 13 is formed on the antistripping layer 12. Further, the transparent conductor layer 14 is formed on the optical adjustment layer 13. The transparent conductor layer 14 is patterned. While a pattern portion 15 has the transparent conductor layer 14 on the optical adjustment layer 13, a non-pattern portion 16 has no transparent conductor layer 14 on the optical adjustment layer 13.

FIG. 3 is a schematic view of a third embodiment of the transparent conductive film of the present invention (Same reference numerals are used in portions that correspond to the configuration common to FIG. 1). In a transparent conductive film 30, an antistripping layer 12 is formed on one main surface of a transparent substrate film 11 and an optical adjustment layer 13 is formed on the antistripping layer 12. Further, a transparent conductor layer 14 is formed on the optical adjustment layer 13. The transparent conductor layer 14 is patterned. While a pattern portion 15 has the transparent conductor layer 14 on the optical adjustment layer 13, a non-pattern portion 16 has no transparent conductor layer 14 on the optical adjustment layer 13. Further, a functional layer 31 is formed on the other main surface of the substrate film 11 which is on a side opposite to the transparent conductor layer 14.

A typical example of the functional layer 31 includes an anti-blocking hard coat layer. When the long transparent conductive film 30 is wound in a roll shape, the anti-blocking hard coat layer has a function of preventing the adjacent transparent conductive film 30 in a radial direction of the roll from being fixed (blocking).

[Substrate Film]

The substrate film 11 is made from a plastic film, such as a polyester film composed of polyethylene terephthalate (PET), polybutylene terephthalate, and polyethylene naphthalate (PEN), a polyethylene film, a polypropylene film, a cellophane film, a diacetylcellulose film, a triacetyle cellulose film, an acetylcellulosebutylate film, a polyvinyl chloride film, a polyvinylidene chloride film, a polyvinyl alcohol film, an ethylene-vinyl acetate copolymer film, a polystyrene film, a polycarbonate film, a polymethyl pentene film, a polysulfone film, a polyether ether ketone film, a polyether sulfone film, a polyether imide film, a polyimide film, a fluorine resin film, a polyamide film, an acrylic resin film, a norbornene-based resin film, a cycloolefin resin film. While the material of the substrate film is not limited to these, polyethylene terephthalate which is superior in transparency, heat resistance, and mechanical properties is particularly preferable.

While the substrate film 11 preferably has, for instance, a thickness of 20 µm or more to 300 µm or less, the thickness thereof is not limited to this. In the case where the thickness of the substrate film 11 is less than 20 µm, it may be difficult to handle the substrate film 11. In the case where the thickness of the substrate film 11 is over 30 µm, the transparent conductive films 10, 20, 30 are too thick when each mounted on a touch panel or the like, which may cause a problem.

While it is not shown, the substrate film 11 may include, for example, an easily adhering layer and an undercoat layer on a surface of the side of the transparent conductor layer 14. The easily adhering layer has a function of increasing adhesion between the substrate film 11 and the antistripping layer 12 or the hard coat layer 18. The undercoat layer has a function of adjusting a reflectance of the substrate film 11.

The substrate film 11 preferably has a thermal shrinkage of −0.5% to +1.5%, more preferably −0.5% to +1.0%, furthermore preferably −0.5% to +0.7%, the most preferably −0.5% to +0.5% in its main surface. When the thermal shrinkage of the substrate film 11 is over 1.5%, for instance, like the time when the transparent conductor layer 14 has been heated and crystallized, the substrate film 11 greatly shrinks by addition of heat to the substrate film 11 and excessive compressive stress is applied on each layer. This may cause each layer to be easily peeled off. The thermal shrinkage of the transparent conductive films 10, 20, 30 is substantially the same as the thermal shrinkage of the substrate film 11.

When the substrate film 11 is conveyed by a roll-to-roll type sputtering device, to prevent the thermal shrinkage of the substrate film 11 from excessively increasing, a layer forming roll preferably has a surface temperature of −20° C. to 100° C., more preferably −20° C. to 50° C., furthermore preferably −20° C. to 0° C. Generally, when the substrate film 11 is conveyed by pulling while heating the substrate film 11 by the layer forming roll, the thermal shrinkage of the substrate film 11 tends to be higher. It is preferable to perform sputtering while cooling the substrate film 11 by use of the layer forming roll so that the thermal shrinkage of the substrate film 11 may not be higher.

[Antistripping Layer]

It is possible to enhance adhesion between the substrate film 11 (or the hard coat layer 18) and the optical adjustment layer 13 by the formation of the antistripping layer 12 between the substrate film 11 (or the hard coat layer 18) and the optical adjustment layer 13.

The antistripping layer 12 includes an inorganic substance and is preferably composed of an inorganic substance such as an inorganic simple body and an inorganic compound, is more preferably composed of an inorganic compound. Examples of the inorganic atoms included in the antistripping layer 12 include metal, such as silicon (Si), niobium (Nb), palladium (Pd), titanium (Ti), indium (In), tin (Sn), cadmium (Cd), zinc (Zn), antimony (Sb), aluminum (Al), tungsten (W), molybdenum (Mo), chrome (Cr), tantalum (Ta), nickel (Ni), platinum (Pt), gold (Au), silver (Ag) or copper (Cu). The inorganic atoms are preferably silicon (Si).

Specifically, the antistripping layer 12 is composed of an elemental silicon or a silicon compound and is preferably composed of a silicon compound from a viewpoint of transparency. In addition, the inorganic compound is preferably composed of a non-stoichiometric inorganic compound.

Examples of the non-stoichiometric inorganic compound include inorganic nitride, such as silicon nitride (e.g. SiNx, 0.1≤x<1.3), inorganic carbide, such as silicon carbide (e.g. SiCx, 0.1≤Sx<1.0), inorganic oxide, such as silicon oxide (e.g. SiOx, 0.1≤x<2.0). The non-stoichiometric inorganic compound is preferably composed of a silicon oxide (e.g. SiOx, 0.1≤x<2.0). Each of these inorganic compounds may be a single composition or a mixture of a plurality of compositions.

In the case where the antistripping layer 12 is composed of, for example, a non-stoichiometric silicon compound, the release blocking function is more improved by adjusting bond energy of a Si2p orbit to a suitable range than the case where the antistripping layer 12 is stoichiometric (e.g. silicon dioxide).

The antistripping layer 12 may be an alloy including at least two kinds of the aforementioned metal. However, it is possible to further improve adhesion between the antistripping layer 12 and the optical adjustment layer 13 by selecting the same kind of metal as the metal of the optical adjustment layer 13 as the antistripping layer 12. Accordingly, the antistripping layer 12 is preferably the same kind of metal as the metal of the optical adjustment layer 13. Examples of such a same kind of metal include a case where the antistripping layer 12 is a silicon (Si) compound and the optical adjustment layer 13 is silicon dioxide ($SiO_2$).

The antistripping layer 12 preferably has a thickness of 1.5 nm to 8 nm. It is possible to obtain both preferable optical characteristics and high adhesion by having a thickness of 1.5 nm to 8 nm in the antistripping layer 12. When the antistripping layer 12 has a thickness of less than 1.5 nm, it becomes difficult to form a continuous thin layer, resulting in a possibility of insufficient improvement of adhesion by use of the antistripping layer 12. When the antistripping layer 12 has a thickness of over 8 nm, reflection and absorption of light is caused by free electron in the antistripping layer 12, resulting in a lower transmission Y value. This makes a display such as a liquid crystal display located under the transparent conductive films 10, 20, 30 hard to see, which results in a possibility of lower visibility.

While the antistripping layer 12 is formed by a sputtering method, a vapor-deposition method or a Chemical Vapor Deposition method, the production method thereof is not limited to these methods. However, the sputtering method is preferable from a viewpoint of denseness of a layer and productivity. When the antistripping layer 12 is deposited by the sputtering method, it is possible to obtain the antistripping layer 12, for example, by applying power having e.g. a power density of 1.0 W/cm$^2$ and sputtering a metal target under a vacuum atmosphere of 0.2 Pa to 0.5 Pa where argon has been introduced. When the antistripping layer 12 composed of a metal single body is formed, the antistripping layer 12 is preferably deposited without introduction of reactive gas such as oxygen.

It is possible to measure the thickness of the antistripping layer 12 by use of an image of a Transmission Electron Microscope (TEM) taken in a cross-section direction. Differences of contrast arise between the antistripping layer 12 and the optical adjustment layer 13 in the cross-section TEM image. When the antistripping layer 12 is thin and an element of the antistripping layer 12 is the same as an element of the optical adjustment layer 13, the differences of contrast may be unclear.

Even in such a case, when a depth profile of bond energy of the element is performed by an X-ray Photoelectron Spectroscopy (XPS, another name: ESCA: Electron Spectroscopy for Chemical Analysis) by use of sputtering etching by argon gas, differences in the bond energy arise between the antistripping layer 12 and the optical adjustment layer 13. This enables confirmation of the existence of the antistripping layer 12.

When the antistripping layer 12 contains silicon atoms (Si), bond energy of the Si2p orbit obtained by the XPS in the antistripping layer 12 is e.g. 98.0 eV or more, preferably 99.0 eV or more, more preferably 100.0 eV or more, furthermore preferably 102.0 eV, in addition, e.g. less than 104.0 eV, preferably less than 103.0 eV, more preferably 102.8 eV or less. Selection of the antistripping layer 12 in which the bond energy of the Si2p orbit is in the aforementioned range makes adhesion of the antistripping layer 12 more preferable. In particular, when the bond energy in the antistripping layer 12 is 99.0 eV or more to less than 103.0 eV, the antistripping layer 12 contains a non-stoichiometric silicon compound. As a result, it is possible to more surely improve adhesion while maintaining preferable light transmittance. In addition, distribution of the bond energy in a thickness direction inside the antistripping layer 12 may have a gradient which gradually becomes higher toward the side of the optical adjustment layer 13 from the side of the antistripping layer 12.

In measurement of bond energy, when a layer such as the optical adjustment layer 13 is formed on the antistripping layer 12, a depth profile (a measurement pitch is set for each 1 nm in silicon dioxide equivalent) is measured by the XPS. When bond energy is continuously changed, a bond energy value from a terminal portion of the side of the substrate film 11 of the antistripping layer 12 to a point of the upper side of 1 nm or more (preferably a point of the upper side of 1 nm) is adopted. In addition, when the inorganic atoms that constitute the antistripping layer 12 are identical to the inorganic atoms that constitute the optical adjustment layer 13 (e.g. when the antistripping layer 12 is a silicon (Si) compound and the optical adjustment layer 13 is silicon dioxide $SiO_2$), a depth position that the element ratio of inorganic atoms (Si) is a half value relative to a peak value is a terminal portion of the antistripping layer 12.

[Optical Adjustment Layer]

The difference of reflectance (reflection color difference ΔE) between the pattern portion 15 and the non-pattern portion 16 of the transparent conductor layer 14 is minimized by forming the optical adjustment layer 13 under the transparent conductor layer 14. This makes patterns of the transparent conductor layer 14 (not shown) hard to be visible. The optical adjustment layer 13 also has a gas barrier function of preventing the layer of the transparent conductor layer 14 from being deteriorated by outgas by avoiding gas such as moisture (outgas) generated from the substrate film 11 from entering a side of the transparent conductor layer 14. Accordingly, there is a case where the optical adjustment layer 13 is referred to as a gas barrier layer.

The optical adjustment layer 13 is mainly made from a metal oxide. A metal kind to be used may be the same kind of metal that forms the antistripping layer 12 or a different kind of metal. To enhance the adhesion between the optical adjustment layer 13 and the antistripping layer 12, the optical adjustment layer 13 is, however, more preferably composed of the same kind of the metal oxide. For instance, when the antistripping layer 12 is composed of silicon (Si) or a silicon compound, the optical adjustment layer 13 is preferably composed of silicon dioxide ($SiO_2$). When the antistripping layer 12 is composed of niobium (nb) or a niobium compound, the optical adjustment layer 13 is preferably composed of niobium oxide ($Nb_2O_5$). When the antistripping layer 12 is palladium (Pd) or a palladium compound, the optical adjustment layer 13 is preferably composed of palladium oxide (PdO). The adhesion between the antistripping layer 12 and the optical adjustment layer 13 is further improved because the optical adjustment layer 13 is composed of a metal oxide that forms the antistripping layer 12.

While the material of the optical adjustment layer 13 is selected from a transparent metal oxide such as silicon dioxide ($SiO_2$), niobium oxide ($Nb_2O_5$), zinc oxide (ZnO), cerium oxide ($CeO_2$), aluminum oxide ($Al_2O_3$), or titanium oxide ($TiO_2$), the material of the optical adjustment layer 13 is not particularly limited to these. When the transparent conductor layer 14 is patterned, in many cases, an acid solution is used, so that the material of the optical adjustment layer 13 preferably has acid resistance.

The optical adjustment layer 13 preferably has a thickness of 10 nm to 25 nm. When the thickness of the optical adjustment layer 13 is less than 10 nm, there is a possibility that scratch resistance of the transparent conductive film 10 may be insufficient. When the thickness of the optical adjustment layer 13 is over 25 nm, a reflection color difference ΔE between the pattern portion 15 and the non-pattern portion 16 becomes larger, leading to a possibility of easy visibility of patterns (not shown) formed on the transparent conductor layer 14.

While the optical adjustment layer 13 is formed on the antistripping layer 12 by the sputtering method, the vapor-deposition method, and Chemical Vapor Deposition method, the production method thereof is not limited to these methods. The optical adjustment layer 13 is deposited in a drying process particularly preferably by the sputtering method. Even in the drying process, it is generally possible to stably obtain a particularly dense layer by the sputtering method. In general, the layer to be formed has a density higher in the sputtering method than, for instance, in the vacuum deposition method, leading to obtain a layer superior in gas barrier properties.

Pressure of sputtering gas (usually, argon gas) at the time when the optical adjustment layer 13 is deposited is preferably 0.09 Pa to 0.5 Pa, more preferably 0.09 Pa to 0.3 Pa. It is possible to form a denser layer by making the pressure of the sputtering gas in the aforementioned range. As a result, it becomes easy to obtain preferable gas barrier properties. When the pressure of the sputtering gas is over 0.5 Pa, it may be impossible to obtain a dense layer and preferable gas barrier properties. When the pressure of the sputtering gas is less than 0.09 Pa, discharging becomes unstable, which may result in formation of voids on the optical adjustment layer 13.

When the optical adjustment layer 13 is deposited by the sputtering method, effective deposition of the optical adjustment layer 13 is possible by use of a reactive sputtering method. For instance, it is possible to obtain a silicon dioxide ($SiO_2$) layer having high gas barrier properties by use of silicon (Si) as a sputtering target, introducing argon as a sputtering gas and oxygen of 10 pressure % to 50 pressure % as a reactive gas relative to argon.

When the optical adjustment layer 13 is deposited by the sputtering method, a power density to be applied to the target is preferably 1.0 $W/cm^2$ to 6.0 $W/cm^2$. When the power density is over 6.0 $W/cm^2$, the optical adjustment layer 13 has greater surface roughness (e.g. arithmetic surface average roughness Ra), which may result in an increase in surface resistance of the transparent conductor layer 14. Conversely, when the power density is less than 1.0 $W/cm^2$, the deposition rate becomes slower, which may result in difficulty in securing productivity.

[Transparent Conductor Layer]

While the transparent conductor layer 14 is composed of, for example, an indium tin oxide (ITO), an indium zinc oxide (IZO) or an indium gallium zinc oxide (IGZO), the material of the transparent conductor layer 14 is not limited to these. While the transparent conductor layer 14 is formed on the optical adjustment layer 13 by the sputtering method, the vapor-deposition method, and the chemical vapor deposition method, the production method thereof is not limited to these methods.

When an indium tin oxide (ITO) is used for the transparent conductor layer 14, the amount of tin oxide ($SnO_2$) contained in the transparent conductor layer 14 relative to the total amount of tin oxide and indium oxide ($In_2O_3$) is preferably 0.5 weight % to 15 weight %, more preferably 3 weight % to 15 weight %, furthermore preferably 5 weight % to 13 weight %. When tin oxide is less than 0.5 weight %, the surface resistance of the transparent conductor layer 14 may become higher. When tin oxide is over 15 weight %, uniformity of the surface resistance in the surface of the transparent conductor layer 14 may be lost. In addition, indium tin oxide may contain components other than tin oxide and indium oxide such as zinc (Zn), gallium (Ga), titanium (Ti), magnesium (Mg), aluminum (Al), gold (Au), silver (Ag) or copper (Cu).

The transparent conductor layer 14 (e.g. indium tin oxide layer) formed at a low temperature is amorphous and can be converted from being amorphous into being crystalline by heat treatment. The transparent conductor layer 14 has a lower surface resistance value by being converted into crystalline qualities.

The transparent conductor layer 14 preferably has an arithmetic surface roughness Ra of 0.1 nm or more to 1.6 nm or less. When the arithmetic surface roughness Ra of the transparent conductor layer 14 is over 1.6 nm, the surface resistance value of the transparent conductor layer 14 may rise. When the arithmetic surface roughness Ra of the transparent conductor layer 14 is less than 0.1 nm, etching failure may occur due to a decrease in adhesion of a photoresist and the transparent conductor layer 14 when patterning the transparent conductor layer 14 by photolithography.

The transparent conductor layer 14 preferably has a thickness of 15 nm or more to 40 nm or less. The transparent conductive films 10, 20, 30 are preferably applicable to touch panels by making the thickness of each of the transparent conductor layer 14 in the aforementioned range. When the thickness of the transparent conductor layer 14 is less than 15 nm, the surface resistance value of the transparent conductor layer may rise. This may cause malfunction of the touch panels. When the thickness of the transparent conductor layer 14 is over 40 nm, the transmittance of light of the transparent conductive films 10, 20, 30 may be lowered and cracks of the transparent conductor layer 14 may appear due to a rise in internal stress. The transparent conductor layer 14 may be a laminated layer where at least two layers of transparent conductor layers are laminated.

[Hard Coat Layer]

The hard coat layer 18 is made from an organic resin and has a function (scratch resistance) to prevent wiring patterns formed on the transparent conductor layer 14 from being disconnected and shorted. The hard coat layer 18 may contain inorganic fine particles 21. The inorganic fine particles 21 are dispersed on the hard coat layer 18. As a result, it is possible to adjust the refractive index of the hard coat layer 18 and improve the transmittance of the transparent conductive film 20. Alternatively, it is possible to bring the reflection hue of the transparent conductive film 20 close to be neutral (an achromatic color).

The material and size of the inorganic fine particles 21 contained in the hard coat layer 18 are not particularly limited. Examples of the inorganic fine particles 21 include zirconium oxide $ZrO_2$, silicon dioxide $SiO_2$, titanium oxide $TiO_2$, tin oxide $SnO_2$, and aluminum oxide $Al_2O_3$. The particle size (average particle size) of each of the inorganic fine particles is preferably 10 nm to 80 nm, more preferably 20 nm to 40 nm. When the particle size is less than 10 nm, particles may not uniformly disperse in the resin. When the particle size is over 80 nm, the surface resistance value of the transparent conductor layer 14 may rise due to irregularities caused on the surface. While the hard coat layer 18 can be formed by coating and drying an organic resin (e.g. an acrylic resin) containing the inorganic fine particles 21 on the substrate film 11, the material and the production method thereof are not limited to this.

The hard coat layer 18 preferably has a thickness of 250 nm to 2,000 nm. When the thickness of the hard coat layer 18 is less than 250 nm, scratch resistance may be insufficient. Since the hard coat layer 18 contains far more gas than the substrate film 11, when the thickness of the hard coat layer 18 is over 2,000 nm, the amount of gas contained (e.g. moisture) in the hard coat layer 18 is excess. This may inhibit crystallization of the transparent conductor layer 14 due to effects of gas (outgas) discharged from the hard coat layer 18. While the refractive index of the hard coat layer 18 is not particularly limited, the refractive index is preferably 1.60 to 1.70. When the refractive index of the hard coat layer 18 departs from this range (1.60 to 1.70), the wiring patterns (not shown) formed on the transparent conductor layer 14 may be easily visible. The refractive index of the hard coat layer 18 is measured by an Abbe refractometer.

[Optical Characteristics of Transparent Conductive Film]

[Transmission Y Value]

Transmission Y value is defined in JIS Z8701 and represents a light transmittance of the transparent conductive films 10, 20, 30 of the present invention. The transparent conductive films 10, 20, 30 of the present invention each have a transmission Y value of 88.0 or more measured from the side of the transparent conductor layer 14. Accordingly, displays such as liquid crystal panels located downward of the transparent conductive films 10, 20, 30 are eye-friendly. When the transmission Y value is less than 88.0, the displays such as liquid crystal panels located downward of the transparent conductive films 10, 20, 30 may become difficult to see, which is not preferable.

[Reflection Color Difference ΔE]

A reflection color difference ΔE represents the difference between the reflection color in the pattern portion 15 and the reflection color in the non-pattern portion 16. The reflection color difference ΔE is represented by the following formula (1) using L* value, a* value, and b* value defined in JIS Z8729:

$$\Delta E=[(L^*_1-L^*_2)^2+(a^*_1-a^*_2)^2+(b^*_1-b^*_2)^2]^{0.5} \quad (1)$$

In the formula (1), $L^*_1$ represents a reflection L* value of the pattern portion 15, $L^*_2$ represents a reflection L* value of the non-pattern portion 16, $a^*_1$ represents a reflection a* value of the pattern portion 15, $a^*_2$ represents a reflection a* value of the non-pattern portion 16, $b^*_1$ represents a reflection b* value of the pattern portion 15, and $b^*_2$ represents a reflection b* value of the non-pattern portion 16. In general, the greater ΔE is, the more clearly a boundary between the pattern portion and the non-pattern portion is visible.

The transparent conductive films 10, 20, 30 each have a reflection color difference ΔE of 7.0 or less between the pattern portion 15 and the non-pattern portion 16. This makes wiring patterns (not shown) formed on the transparent conductor layer 14 hard to be visible. When the reflection color difference ΔE between the pattern portion 15 and the non-pattern portion 16 is over 7.0, the patterns of the transparent conductor layer 14 may become visible, which is not preferable.

EXAMPLES

Examples and Comparative Examples

While the transparent conductive film of the present invention will now be described in detail, it is understood that the present invention is not limited to these descriptions.

Example 1

FIG. 2 shows a layer configuration of Example 1. A substrate film 11 is a polyethylene terephthalate (PET) film with a thickness of 100 μm. A hard coat layer 18 is an acrylic resin layer with a thickness of 300 nm including zirconium oxide ($ZrO_2$) particles with an average particle size of 20 nm (maximum particle size: less than 100 nm). An antistripping layer 12 is composed of a non-stoichiometric silicon (Si) compound and is formed by sputtering, which has a thickness of 2.5 nm. An optical adjustment layer 13 is composed of silicon dioxide ($SiO_2$) and is formed by sputtering, which has a thickness of 14 nm. A transparent conductor layer 14 is composed of an indium tin oxide (ITO) layer and has a thickness of 20.5 nm.

[Formation of Hard Coat Layer]

An ultraviolet (UV)-curable resin composition including an acrylic resin and zirconium oxide ($ZrO_2$) particles (average particle size: 20 nm) was diluted with methyl isobutyl ketone (MIBK) to make the solid content concentration thereof might be 5 weight %. Thus obtained diluted composition was coated on one main surface of a polyethylene terephthalate (PET) substrate film 11 (produced by MITSUBISHI PLASTICS, INC.; product name: DAIA FOIL) with a thickness of 100 μm to be dried. Next, the diluted composition was cured by the irradiation of ultraviolet rays to form the hard coat layer 18 with a thickness of 300 nm. The polyethylene terephthalate substrate film 11 formed on the hard coat layer 18 was wound around to make a polyethylene terephthalate substrate film roll.

[Formation of Antistripping Layer and Optical Adjustment Layer]

An antistripping layer 12 and an optical adjustment layer 13 (and a transparent conductor layer 14 to be described later) were formed by use of a roll-to-roll sputtering apparatus. The polyethylene terephthalate substrate film roll having a hard coat layer 18 was placed in a supply portion of the sputtering apparatus and was kept in a vacuum state of $1\times10^{-4}$ Pa for 15 hours. Subsequently, the substrate film 11 was unreeled from the supply portion to wind the substrate film 11 around a layer forming roll. First, the antistripping layer 12 and then the optical adjustment layer 13 were continuously deposited. The surface temperature of the layer forming roll was set at 0° C. at this time.

[Antistripping Layer]

A film forming chamber in a roll-to-roll sputtering apparatus was under an argon atmosphere with a pressure of 0.3 Pa and 1.0 W/cm² of power was provided to sputter a silicon (Si) target (produced by Sumitomo Metal Mining Co., Ltd.). As a result, an antistripping layer 12 with a thickness of 2.5 nm (a silicon compound: Si2p orbit-bond energy 102.4 eV) was obtained. Deposition was performed without introduction of oxygen into the vacuum atmosphere.

A transmission Y value where an antistripping layer was formed by 10 nm under the deposition conditions similar to the above was measured as a sample. As a result, it was confirmed that the transmission Y value after deposition reduced by 2.8 compared with the transmission Y value before deposition. This allowed confirmation that an uppermost value of the thickness of the antistripping layer was suitable to be 8 nm.

[Optical Adjustment Layer]

A film forming chamber was set to be in an argon atmosphere with a pressure of 0.2 Pa. 3.5 W/cm² of power was provided to sputter a silicon (Si) target (produced by Sumitomo Metal Mining co., Ltd.). As a result, an optical adjustment layer 13 with a thickness of 14 nm (silicon dioxide ($SiO_2$) layer) was obtained.

[Formation of Transparent Conductor Layer]

Next, the substrate film 11 where the optical adjustment layer 13 had been deposited was wound around the layer forming roll to deposit a transparent conductor layer 14. The temperature of the layer forming roll was set at 0° C. at this time. When the transparent conductor layer 14 was deposited, the pressure ratio between argon:oxygen was 99:1 and all gas pressure was in a sputtering atmosphere with 0.3 Pa and 1.0 W/cm² of power was provided. Under such conditions, an indium tin oxide target composed of a sintered body containing 10 weight % of tin oxide and 90 weight % of indium oxide was sputtered. As a result, a transparent conductor layer 14 with a thickness of 20.5 nm (indium tin oxide (ITO)) was formed. Subsequently, the substrate film 11 was wound on a housing roll to complete a transparent conductive film roll.

Example 2

A transparent conductive film in Example 2 was produced in the same manner as in Example 1 except that the optical adjustment layer 13 had a thickness of 17 nm.

Example 3

A transparent conductive film in Example 3 was produced in the same manner as in Example 1 except that the optical adjustment layer 13 had a thickness of 20 nm.

Example 4

A transparent conductive film was produced in the same manner as in Example 1 except that the temperature of the layer forming roll at the time of depositing the antistripping layer 12, the optical adjustment layer 13, and the transparent conductor layer 14 was set at 40° C.

Example 5

A transparent conductive film was produced in the same manner as in Example 1 except that the surface temperature of the layer forming roll at the time of depositing the antistripping layer, the optical adjustment layer, and the transparent conductor layer was set at 100° C.

Comparative Example 1

A transparent conductive film in Comparative Example 1 was produced in the same manner as in Example 1 except that the antistripping layer had a thickness of 1 nm.

Comparative Example 2

A transparent conductive film in Comparative Example 2 was produced in the same manner as in Example 1 except that the antistripping layer had a thickness of 10 nm.

Comparative Example 3

A transparent conductive film in Comparative Example 3 was produced in the same manner as in Example 1 except that the optical adjustment layer had a thickness of 30 nm.

Comparative Example 4

A transparent conductive film in Comparative Example 4 was produced in the same manner as in Example 1 except that the antistripping layer with a thickness of 2.5 nm was deposited (i.e. a non-stoichiometric silicon dioxide SiO$_2$ layer was deposited) under the same conditions as the optical adjustment layer.

Table 1 indicates configurations and characteristics of Examples 1 to 5, Comparative Examples 1 to 4 of the transparent conductive films.

shrinkage of 0.70%. When the surface temperature of the layer forming roll was 100° C. (Example 5), the substrate film had a thermal shrinkage of 1.20%.

[Transmission Y Value]

A transmission Y value was measured in each Example and each Comparative Example. While the transmission Y value was preferably 88.0 or more, Examples and Compara-

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Layer configuration (layer thickness) | Transparent conductor layer (ITO) (nm) | 20.5 | 20.5 | 20.5 | 20.5 | 20.5 | 20.5 | 20.5 | 20.5 | 20.5 |
| | Optical adjustment layer (SiO$_2$) (nm) | 14 | 17 | 20 | 14 | 14 | 14 | 14 | 30 | 14 |
| | Antistripping layer (nm) | 2.5 | 2.5 | 2.5 | 2.5 | 2.5 | 1 | 10 | 2.5 | SiO$_2$ 2.5 |
| | Hard coat layer (Acrylic ZrO$_2$) (nm) | 300 | 300 | 300 | 300 | 300 | 300 | 300 | 300 | 300 |
| | Substrate film (PET) (μm) | 100 | 100 | 100 | 100 | 100 | 100 | 100 | 100 | 100 |
| Bond energy of Si2p orbit of a release blocking layer (eV) | | 102.4 | 102.4 | 102.4 | 102.6 | 102.8 | 103.0 | 98.7 | 102.4 | 103.1 |
| Temperature of a layer forming roll (° C.) | | 0 | 0 | 0 | 40 | 100 | 0 | 0 | 0 | 0 |
| Thermal shrinkage (%) of a substrate film | | 0.30 | 0.30 | 0.30 | 0.70 | 1.20 | 0.30 | 0.30 | 0.30 | 0.30 |
| Peeling (pcs.) 85 (° C.), 85% RH, 240 h, 10 cells × 10 cells | | 0 | 0 | 0 | 0 | 3 | 21 | 0 | 0 | 15 |
| Transmission Y value | | 89.7 | 89.9 | 90.2 | 89.8 | 89.8 | 90.4 | 86.9 | 90.3 | 90.6 |
| Reflection ΔE value | | 4.9 | 5.9 | 6.9 | 5.1 | 4.8 | 4.3 | 2.1 | 8.7 | 4.1 |
| Pattern visibility | | Good | Good | Good | Good | Good | Good | Bad | Bad | Good |
| Overall evaluation | | Good | Good | Good | Good | Acceptable | Bad | Bad | Bad | Bad |

[Peeling]

Peeling in Examples and Comparative Examples was investigated in accordance with old JIS K5400. First, a sample was kept in a constant temperature and humidity chamber at a temperature of 85° C. and a relative humidity of 85% for 240 hours. Next, the sample was removed from the constant temperature and humidity chamber to make a half cut with a pitch of 1 mm: 10 cells×10 cells=100 cells to investigate the number of cells where peeling occurred. No peeling occurred in Examples 1 to 4, Comparative Examples 2 and 3. A large number of peeling which was more than 15 occurred in Comparative Examples 1 and 4. Peeling occurred between the hard coat layer and the antistripping layer.

It is presumed that the reason why peeling occurred frequently in Comparative Example 1 was that it was not possible to keep bond energy of the antistripping layer at a low level due to the extremely thin thickness of the antistripping layer. It is presumed that the reason why peeling occurred frequently in Comparative Example 4 was that bond energy was not in a suitable range because the antistripping layer (SiO$_2$) was deposited while introducing oxygen.

[Thermal Shrinkage]

Thermal shrinkages of the substrate film had a positive correlation with the surface temperature of the layer forming roll. In other words, when the surface temperature of the layer forming roll was 0° C. (Examples 1 to 3, Comparative Examples 1 to 4), the substrate film had a thermal shrinkage of 0.30%. When the surface temperature of the layer forming roll was 40° C. (Example 4), the substrate film had a thermal tive Examples except Comparative Example 2 satisfied this. It is presumed that the reason why the transmission Y value in Comparative Example 2 is small is due to the extremely thick thickness of the antistripping layer. When the thickness of the antistripping layer is thick, metal reflection and absorption occur, which leads to a small transmission Y value.

[Reflection Color Difference ΔE Value]

A reflection color difference ΔE value was measured in each Example and each Comparative Example. To make the patterns of the transparent conductor layer invisible, the reflection color difference ΔE value is preferably 7.0 or less. Examples and Comparative Examples except Comparative Example 3 satisfied this. It is presumed that the reason why the reflection color difference ΔE value in Comparative Example 3 is large is that the thickness of the optical adjustment layer is too thick.

[Pattern Visibility]

Pattern visibility in Examples and Comparative Examples was measured. It is preferable that patterns formed on the transparent conductor layer are invisible in pattern visibility. In table 1, "Good" means that pattern visibility is good and "Bad" means that pattern visibility is poor. Comparative Example 2 is similar to Examples in that patterns formed on the transparent conductor layer is invisible. However, the transmission Y value becomes lower due to the thick antistripping layer, resulting in low visibility of the liquid crystal panel. Accordingly, Comparative Example 2 was judged as poor pattern visibility. In Comparative Example 3, the reflection color difference ΔE becomes higher due to the thick optical adjustment layer, resulting in visible patterns of the transparent conductor layer. Accordingly, Comparative Example 3 was judged as poor pattern visibility.

[Overall Evaluation]

Overall evaluation of adhesion between layers of the transparent conductive film and wiring pattern visibility was judged that Examples 1 to 4 were good, Example 5 was a level in which there are practically no problems (acceptable), and Comparative Examples 1 to 4 were bad.

[Measuring Method]
[Thickness]

The cross-section of a transparent conductive film was observed by use of a transmission electron microscope (manufactured by Hitachi, Ltd.; product name: HF-2000) to measure each thickness of the antistripping layer, the optical adjustment layer, and the transparent conductor layer.

[Transmission Y Value]

A transmission Y value is measured as below. A measuring apparatus: dot-3 (manufactured by MURAKAMI COLOR RESEARCH LABORATORY CO., LTD.) or an equivalent model is used. Light enters from a side of the transparent conductor layer in a transparent conductor to obtain a transmission spectrum. A transmission Y value is calculated from the transmission spectrum. A light source to be used was a D65 light source defined in JIS Z8716 and the viewing angle is a viewing angle of 2°. When the transparent conductor layer is amorphous, measurements may be performed after the conversion into crystalline qualities e.g. by heating at 150° C. for one hour.

[Reflection Color Difference ΔE]

A reflection color difference ΔE is measured as below. First, measurement is performed in a pattern portion. A surface of the transparent conductive film opposite to the transparent conductor layer is adhered to an absorber such as a black tape lest reflection from the back side of the transparent conductive layer should be measured. Refractive index spectrum is measured by use of U-4100 (+ integrating sphere unit) manufactured by Hitachi Ltd. or an equivalent reflectance measuring apparatus. Measurement conditions of the refractive index spectrum are as follows:

Data mode: % R
Measurement range: 380 nm to 780 nm
Scan speed: 600 nm/minute
Slit: 4 nm
Sampling interval: 5 nm
Light source D65, viewing field: 2° viewing field When the transparent conductor layer is amorphous, a reflection color difference ΔE may be measured after the conversion of the transparent conductor layer into crystalline qualities by heating at, for instance, 150° C. for one hour. A non-pattern portion is then measured. The aforementioned sample is immersed in 10 weight % of hydrochloric acid at 50° C. for one minute and the transparent conductor layer was etched. Subsequently, a reflectance spectrum of the non-pattern portion is measured in the same manner as the pattern portion to calculate a reflection color difference ΔE from the obtained reflectance spectrum.

[Thermal Shrinkage]

From the transparent conductive film, a sample was taken in a square of 100 mm (L1 is an initial length) in a machine direction (MD) and 100 mm in a direction orthogonal thereto (TD: transverse direction), and the sample was heated at 140° C. for 90 minutes. The length of the sample (the length after heating is L2) in the maximum thermal shrinkage direction (MD in Examples 1 to 4 and Comparative Examples 1 to 4) after heating was measured, and the maximum thermal shrinkage was calculated in accordance with the equation of "maximum thermal shrinkage (%)={(L1−L2)/L1}×100."

[Bond Energy]

X-ray photoelectron spectroscopy (XPS; ESCA) was performed for a transparent conductive film under the conditions below in each Example and Comparative Example to obtain a depth profile. Bond energy of a Si2p orbit in an antistripping layer (area located from 0 to 2 nm in a thickness direction from the substrate film side) was obtained.

Measuring apparatus: Quantum 2000, produced by ULVAC-PHI, INCORPORATED
X-ray source: Monochrome AlKα
X-Ray setting: 200 μmϕ, 15 kV, 30 W
Photoelectronic extraction angle: 450 relative to a sample surface
Charging neutralization conditions: Combination of an electron neutralizer gun and an Ar ion gun (neutralization mode)
Bond energy: A peak derived from a C—C bond of C1s spectrum was corrected to 285.0 eV (an outermost surface only)
Accelerating voltage of the Ar ion gun: 1 kV
Etching rate of the Ar ion gun: 2 nm/minute (SiO$_2$ equivalent)
Etching area: 2 mm×2 mm

[Pattern Visibility]

Visibility of wiring patterns was evaluated as below. The transparent conductive film was cut into a rectangle shape of 5 cm×10 cm. Next, a polyimide tape with a width of 1 mm was adhered to a surface of a transparent conductor layer of the transparent conductive film in parallel to a short side in a stripe state at intervals of 2 mm. Subsequently, the transparent conductive film was immersed in 10 mass % of hydrochloric acid at 50° C. for five minutes. This made it possible to obtain wiring patterns of the transparent conductor layer having a stripe pattern portion. Next, the polyimide tape was peeled off and a surface of the transparent conductive film without a transparent conductor layer was adhered to a black board to prepare a sample for evaluation of wiring pattern visibility. Subsequently, the wiring patterns were visually observed to evaluate pattern visibility in accordance with the following standards:

(Standards)
Good: Patterns of the transparent conductor layer are hardly visible.
Bad: Patterns of the transparent conductor layer are easily visible.

INDUSTRIAL APPLICABILITY

While the uses of the transparent conductive film of the present invention are not limited, in particular, the transparent conductive film is preferably used for a touch panel.

DESCRIPTION OF REFERENCE NUMERALS

10: transparent conductive film; 11: substrate film; 12: antistripping layer; 13: optical adjustment layer; 14: transparent conductor layer; 15: pattern portion; 16: non-pattern portion; 18: hard coat layer; 20: transparent conductive film; 21: inorganic fine particle; 30: transparent conductive film; 31: functional layer; 40: transparent conductive film; 41: substrate film; 42: antistripping layer; 43: optical adjustment layer; 44: transparent conductor layer; 45: pattern portion; 46: non-pattern portion.

What is claimed is:

1. A transparent conductive film comprising:
   a transparent substrate film;
   an antistripping layer formed on one main surface of the substrate film;
   an optical adjustment layer including an inorganic oxide formed on the antistripping layer; and
   a transparent conductor layer having a pattern formed on the optical adjustment layer,
   wherein the pattern includes a pattern portion with the transparent conductor layer and a non-pattern portion without the transparent conductor layer,
   the antistripping layer has a thickness of 1.5 nm to 8 nm,
   the substrate film has a thermal shrinkage of −0.5% to +1.5% in the main surface;
   a transmission Y value measured from a side of the transparent conductor layer is 88.0 or more, and
   a reflection color difference ΔE between the pattern portion and the non-pattern portion represented by the following formula (1) is 7.0 or less:

$$\Delta E=[(L^*_1-L^*_2)^2+(a^*_1-a^*_2)^2+(b^*_1-b^*_2)^2]^{0.5} \quad (1)$$

wherein $L^*_1$ represents a reflection $L^*$ value of the pattern portion, $L^*_2$ represents a reflection $L^*$ value of the non-pattern portion, $a^*_1$ represents a reflection $a^*_1$ value of the pattern portion, $a^*_2$ represents a reflection $a^*_2$ value of the non-pattern portion, $b^*_1$ represents a reflection $b^*_1$ value of the pattern portion, and $b^*_2$ represents a reflection value $b^*_2$ of the non-pattern portion.

2. The transparent conductive film according to claim 1, wherein the optical adjustment layer has a thickness of 10 nm to 25 nm.

3. The transparent conductive film according to claim 1, wherein the antistripping layer includes a non-stoichiometric inorganic compound.

4. The transparent conductive film according to claim 1, wherein the antistripping layer includes silicon atoms.

5. The transparent conductive film according to claim 1, wherein the antistripping layer includes a silicon compound.

6. The transparent conductive film according to claim 4, wherein bond energy of a Si2p bond has an area of 98.0 eV or more to less than 103.0 eV.

7. The transparent conductive film according to claim 1, wherein the antistripping layer includes a silicon oxide.

8. The transparent conductive film according to claim 1, further comprising a hard coat layer formed between the substrate film and the antistripping layer.

9. The transparent conductive film according to claim 8, wherein the hard coat layer has a refractive index of 1.60 to 1.70 and a thickness of 250 nm to 2,000 nm.

10. The transparent conductive film according to claim 8, wherein the hard coat layer contains any one of zirconium oxide $ZrO_2$, silicon dioxide $SiO_2$, titanium oxide $TiO_2$, tin oxide $SnO_2$, aluminum oxide $Al_2O_3$ or at least two kinds of inorganic fine particles of these.

11. The transparent conductive film according to claim 1, further comprising a functional layer formed on the other main surface of the substrate film located on a side opposite to the transparent conductor layer.

12. The transparent conductive film according to claim 11, wherein the functional layer is composed of an anti-blocking hard coat layer.

13. The transparent conductive film according to claim 2, wherein the antistripping layer includes a non-stoichiometric inorganic compound.

14. The transparent conductive film according to claim 5, wherein bond energy of a Si2p bond has an area of 98.0 eV or more to less than 103.0 eV.

15. The transparent conductive film according to claim 2, wherein the antistripping layer includes a silicon oxide.

16. The transparent conductive film according to claim 2, wherein the substrate film has a thermal shrinkage of −0.5% to +1.5% in the main surface.

17. The transparent conductive film according to claim 9, wherein the hard coat layer contains any one of zirconium oxide ZrO2, silicon dioxide $SiO_2$, titanium oxide $TiO_2$, tin oxide $SnO_2$, aluminum oxide $Al_2O_3$ or at least two kinds of inorganic fine particles of these.

18. The transparent conductive film according to claim 2, further comprising a functional layer formed on the other main surface of the substrate film located on a side opposite to the transparent conductor layer.

19. The transparent conductive film according to claim 18, wherein the functional layer is composed of an anti-blocking hard coat layer.

* * * * *